US011933332B1

(12) United States Patent
Pintore et al.

(10) Patent No.: US 11,933,332 B1
(45) Date of Patent: Mar. 19, 2024

(54) ISOLATED CYLINDER SYSTEMS FOR LOAD SENSING ARCHITECTURE PLANTER

(71) Applicant: CNH Industrial America LLC, New Holland, PA (US)

(72) Inventors: Francesco Pintore, Modena (IT); Stefano Fiorati, Coronella-Poggio Renatico (IT); Eugenio Leati, Modean (IT); Trevor Philip Stanhope, Oak Lawn, IL (US); Xiaofan Guo, West Lafayette, IN (US); Andrea Vacca, West Lafayette, IN (US); Patrick Michael Stump, Lafayette, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/952,474

(22) Filed: Sep. 26, 2022

(51) Int. Cl.
| F15B 7/08 | (2006.01) |
| A01C 7/00 | (2006.01) |
| F15B 1/02 | (2006.01) |
| F15B 7/00 | (2006.01) |
| F15B 11/16 | (2006.01) |

(52) U.S. Cl.
CPC ............. *F15B 7/08* (2013.01); *A01C 7/00* (2013.01); *F15B 1/024* (2013.01); *F15B 7/001* (2013.01); *F15B 11/161* (2013.01)

(58) Field of Classification Search
CPC ...... F15B 2211/20576; F15B 11/20584; F15B 11/17
See application file for complete search history.

(56) References Cited

U.S. PATENT DOCUMENTS

| 5,615,553 A | 4/1997 | Lourigan |
| 5,918,558 A | 7/1999 | Susag |
| 6,182,588 B1 * | 2/2001 | Bodie .................... F15B 11/17 |
| | | 180/53.61 |

(Continued)

FOREIGN PATENT DOCUMENTS

WO 2019157521 8/2019

OTHER PUBLICATIONS

Schulte, "The Benefits of Intelligent PCLS and Pressure Compensated System Architecture," Parker Hannifin Corporation, Sep. 18, 2020, 7 pgs, https://blog.parker.com/site/USA/en-US/details-home-page/the-benefits-of-intelligent-pcls-and-pressure-compensated-system-architecture-us.

(Continued)

*Primary Examiner* — Michael Leslie
*Assistant Examiner* — Daniel S Collins
(74) *Attorney, Agent, or Firm* — Rebecca L. Henkel; Rickard K. DeMille (57) ABSTRACT

A hydraulic drive system for an agricultural implement includes a high pressure supply line configured to provide hydraulic fluid under pressure. The hydraulic drive system also includes a low pressure return line configured to return the hydraulic fluid. The hydraulic drive system further includes a plurality of hydraulic motors and coupled to the high pressure supply line. The hydraulic drive system still further includes a plurality of cylinder systems isolated from the high pressure supply line to minimize a supply pressure of the hydraulic fluid provided from a pump coupled to the high pressure supply line and to minimize throttling losses in the hydraulic drive system during operation of the hydraulic drive system.

16 Claims, 7 Drawing Sheets

(56) References Cited

U.S. PATENT DOCUMENTS

| | | |
|---|---|---|
| 8,272,471 B2 | 9/2012 | Gehloff |
| 9,033,077 B2 | 5/2015 | Kurkinen et al. |
| 9,769,977 B2 | 9/2017 | Beck et al. |
| 11,128,136 B2 | 9/2021 | Abaitancei et al. |
| 2007/0289298 A1* | 12/2007 | Thompson .............. F15B 1/021 60/469 |
| 2021/0003470 A1 | 1/2021 | Schoeny et al. |
| 2022/0030756 A1 | 2/2022 | Vennemann |

OTHER PUBLICATIONS

Stump et al., "Energy Management of Low-Pressure Systems Utilizing Pump-Unloading Valve and Accumulator," Energies 2019, 12, 4423, Nov. 21, 2019, 17 pgs, www.mdpi.com/journal/energies.

\* cited by examiner

ISOLATED CYLINDER SYSTEMS FOR LOAD SENSING ARCHITECTURE PLANTER

BACKGROUND

The present disclosure relates generally to agricultural implements and, more particularly, to a hydraulic drive system for an agricultural implement with isolated cylinder systems.

Work vehicles, such as tractors and other agricultural vehicles, include a hydraulic system configured to control the supply of hydraulic fluid to various on-board hydraulic components and/or various auxiliary hydraulic components, such as one or more hydraulic motors and/or cylinders included within an implement being towed by the vehicle. Conventional hydraulic systems utilize pressure-compensated flow control valve sections to modulate the flow of hydraulic fluid to the various auxiliary hydraulic components. In these conventional systems, a pump is configured to supply pressurized fluid to a flow control valve that regulates the flow of hydraulic fluid to a given hydraulic component. The load sensed at the flow control valve is then used to adjust the output pressure of the pump.

Such conventional hydraulic systems are capable of operating quite efficiently when supplying hydraulic fluid to auxiliary hydraulic components that do not require pressure control. However, when supplying hydraulic fluid to auxiliary hydraulic components that do require pressure control, conventional hydraulic systems have certain disadvantages. For example, many implements, such as planters and seeders, include certain components (e.g., components enabling the implement to operate in a down pressure mode) that impose higher pressure requirements than other components on the hydraulic system. As a result, those components with lesser pressure requirements receive hydraulic fluid at a much high pressure than needed which needs to be metered down to a lower level resulting a significant amount of energy wasted due to high throttling loss in the hydraulic system. The high pressure requirements of certain components on the implement lead to the pump being operated at a significantly reduced efficiency and also leads to excessive heat generation.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a hydraulic drive system for an agricultural implement includes a high pressure supply line configured to provide hydraulic fluid under pressure. The hydraulic drive system also includes a low pressure return line configured to return the hydraulic fluid. The hydraulic drive system further includes a plurality of hydraulic motors and coupled to the high pressure supply line. The hydraulic drive system still further includes a plurality of cylinder systems isolated from the high pressure supply line to minimize a supply pressure of the hydraulic fluid provided from a pump coupled to the high pressure supply line and to minimize throttling losses in the hydraulic drive system during operation of the hydraulic drive system.

In certain embodiments, a hydraulic drive system for an agricultural planter includes a high pressure supply line configured to provide hydraulic fluid under pressure. The hydraulic drive system also includes a low pressure return line configured to return the hydraulic fluid. The hydraulic drive system further includes a plurality of hydraulic motors coupled to the high pressure supply line. The hydraulic drive system still further includes a plurality of cylinder systems isolated from the high pressure supply line. The hydraulic drive system yet further includes a load sensing system coupled to the plurality of hydraulic motors, wherein the load sensing system is configured to provide a load sensing signal to a work vehicle coupled to the agricultural implement that provides the hydraulic fluid to the high pressure supply line, and wherein the load sensing signal is from a highest load pressure from among the plurality of hydraulic motors.

In certain embodiments, an agricultural planer includes a hydraulic system. The hydraulic system includes a high pressure supply line configured to provide hydraulic fluid under pressure. The hydraulic drive system also includes a low pressure return line configured to return the hydraulic fluid. The hydraulic drive system further includes a plurality of hydraulic motors coupled to the high pressure supply line. The hydraulic drive system still further includes a plurality of cylinder systems isolated from the high pressure supply. The hydraulic drive system still further includes a boost pump having an inlet coupled to the high pressure supply line or to the low pressure return line, wherein the boost pump is coupled to and configured to hydraulically power the plurality of cylinder systems. The hydraulic drive system still further includes an accumulator coupled to both the plurality of cylinder systems and the boost pump, the accumulator being configured to stabilize pressure in the hydraulic drive system. The hydraulic motor from among the plurality of hydraulic motors is coupled to and configured to hydraulically power the boost pump

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
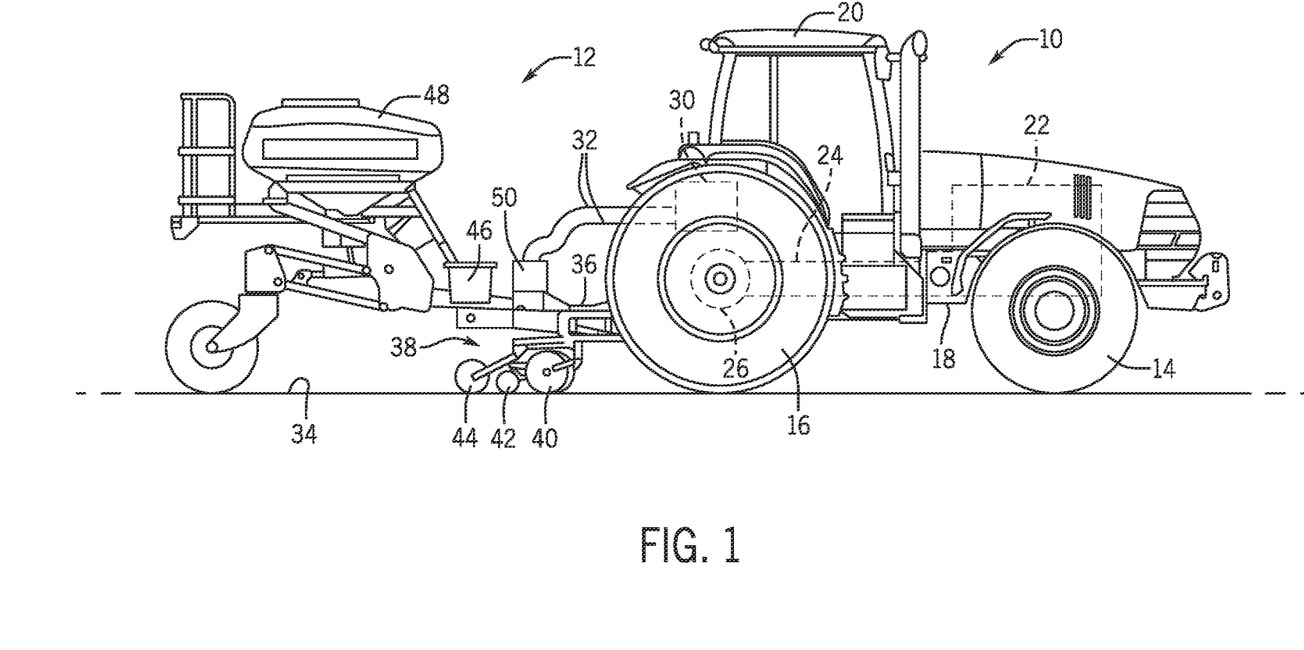
FIG. 1 is a side view of a work vehicle towing an implement, in accordance with aspects of the present disclosure.

FIG. 1 illustrates a side view of one embodiment of a work vehicle 10 towing an implement 12 in accordance with aspects of the present subject matter. As shown, the work vehicle 10 is configured as an agricultural tractor. However, in other embodiments, the work vehicle 10 may be configured as any other suitable work vehicle known in the art that is configured to tow an implement, such as various other agricultural vehicles and/or the like.

As shown in FIG. 1, the work vehicle 10 includes a pair of front wheels 14, a pair or rear wheels 16 and a chassis 18 coupled to and supported by the wheels 14, 16. An operator's cab 20 may be supported by a portion of the chassis 18 and may house various control devices (e.g., levers, pedals, control panels and/or the like) for permitting an operator to control the operation of the work vehicle 10 and/or the implement 12. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train of the work vehicle 10.

The work vehicle 10 may also include one or more auxiliary systems coupled to the engine 22. For example, as shown in FIG. 1, the work vehicle 10 may include a vehicle hydraulic system 30 that serves to provide a source of pressurized hydraulic fluid for powering various hydraulic components (e.g., actuators, motors, etc.) used for controlling the operation of the implement 12 and/or other detachable equipment. In several embodiments, the hydraulic system 30 may include one or more valves or valve blocks for controlling the flow of hydraulic fluid supplied to the implement 12 (e.g., via hydraulic lines 32).

As shown in FIG. 1, the implement 12 corresponds to a planter or seeder configured to be towed behind the work vehicle 10 across the ground 34. In several embodiments, the implement 12 may include a frame 36 and a plurality of planter units 38 coupled to and supported by the frame 36. As is generally understood, the planter units 38 may be configured to deposit seeds and/or fertilizer at a desired depth beneath the soil surface, thereby establishing rows of planted seeds. As such, each planter unit 38 may include one or more ground-engaging tools or components configured to engage or otherwise contact the ground 34. For example, in one embodiment, each planter unit 38 may include a pair of laterally spaced opener discs 40, a pair of laterally spaced furrow closer discs 42 and a press wheel 44. Seeds, fertilizer and/or other agricultural material may be supplied to each planter unit 38 via an individual hopper 46 and/or a bulk-fill hopper 48.

Additionally, the implement 12 may include an implement hydraulic system 50 configured to receive hydraulic fluid from the vehicle hydraulic system 30 (e.g., via lines 32) and supply such fluid to any number of hydraulic components associated with the implement 12. For example, in one embodiment, the implement 12 may include a plurality of hydraulic cylinders configured to raise and lower one or more of the ground-engaging components of the planter units 38 relative to the ground 34. In such instance, the hydraulic fluid received from the vehicle hydraulic system 30 may be distributed to the various cylinders via the implement hydraulic system 50 (e.g., hydraulic drive system). In addition, the implement 12 may include various other hydraulic components configured to receive hydraulic fluid, such as one or more hydraulic motors that may be used to drive a fan and/or seed drive of the implement 12 and/or that may be used to adjust the implement 12 to a transport configuration (e.g., by folding in wing sections of the frame 36).

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of tires.

Figure 2:
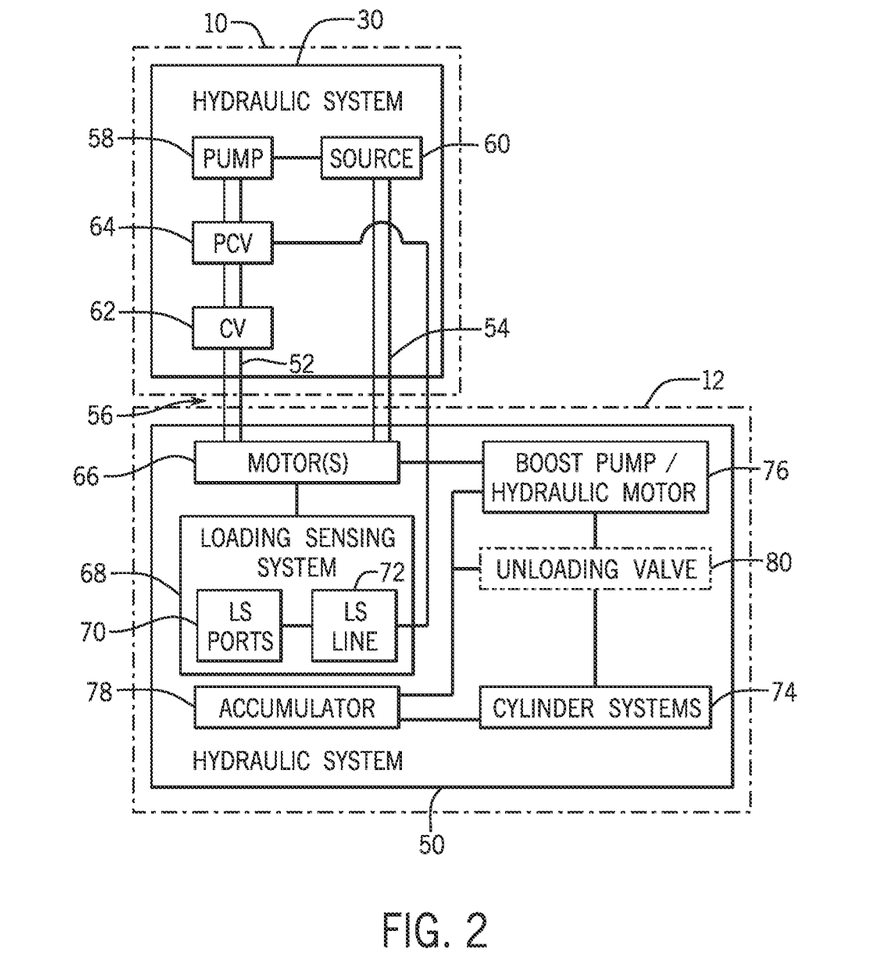
FIG. 2 is a schematic view of a work vehicle coupled to an implement and associated hydraulic systems, in accordance with aspects of the present disclosure.

FIG. 2 is a schematic view of the work vehicle 10 coupled to the implement 12 (e.g., plantar) and associated hydraulic systems. The work vehicle 10 includes the hydraulic system 30. The hydraulic system 30 provides pressurized hydraulic fluid to the implement hydraulic system 50 (e.g., hydraulic drive system) via a supply line 52 (e.g., high pressure supply line). Hydraulic fluid is returned to the hydraulic system 30 from the implement hydraulic system 50 at a lower pressure via a return line 54 (e.g., a low pressure return line). The supply line 52 and the return line 54 form a main hydraulic circuit 56. In certain embodiments, there may be multiple supply lines 52 and return lines 54 forming multiple hydraulic circuits between the hydraulic system and the implement hydraulic system 50.

The hydraulic system 30 includes a pump 58 located on the work vehicle 10 that is configured receive hydraulic fluid from a fluid source 60 (e.g., tank) and to provide the fluid (e.g., hydraulic fluid) for output via the supply line 52 to the implement hydraulic system 50. The hydraulic system 30 includes a control valve 62 (e.g., flow control valve) in flow communication with the supply line 52. The control valve 62 is configured to regulate the supply of the hydraulic fluid between the pump 58 and the supply line 52. The hydraulic system 30 also includes a pressure control valve 64 fluidly coupled between the pump 58 and the control valve 62. The pressure control valve 64 is in flow communication with the supply line 52. The pressure control valve 64 regulates the pressure of the hydraulic fluid being supplied to the control valve 122 from the pump 58.

The implement hydraulic system 50 includes a plurality of hydraulic motors 66 associated with driving various functions (e.g., fertilizer, vacuum fan, bulk fill fan, alternator, etc.) of the implement 12. These hydraulic motors 66 are coupled to the main hydraulic circuit 56. In certain embodiments, one or more of the hydraulic motors 66 may be coupled to different hydraulic circuits. The hydraulic motors 66 may include an alternator motor, a vacuum motor, bulk fill motor, compressor motor, and fertilizer motor.

The implement hydraulic system 50 includes a load sensing architecture or system 68. Respective control valve blocks of the hydraulic motors 66 are respectively coupled to load sensing ports 70. The load sensing ports 70 are coupled to a single load sensing line 72 and provide respective load sensing signals for the hydraulic motors 66. The load sensing line 72 provides a load sensing signal to pressure control valve 64 to regulate the pressure of the supplied hydraulic fluid provided to the implement hydraulic system 50. The load sensing signal provided to the pressure control valve 64 is the load sensing signal from the respective load sensing signals from the hydraulic motors 66 that has the highest load pressure. The supply pressure of the hydraulic fluid provided to each of the hydraulic motors 66 will be the highest load pressure plus the pump margin. In certain embodiments, the load sensing system 68 may be an electronic load sensing system having respective pressure sensors associated with respective hydraulic motors 66, instead of the load sensing line, to transmit the load with the highest load pressure being provided to the pressure control valve.

The implement hydraulic system 50 includes a plurality of hydraulic cylinder systems 74. The hydraulic cylinder systems 74 may include a weight management (e.g., weight distribution) cylinder system. The hydraulic cylinder systems 74 may also include a hydraulic down pressure system having a plurality of down pressure cylinders for raising and lowering ground-engaging components (e.g., opener discs 40, closure discs 42, press wheel, etc.) of the implement 12.

The plurality of hydraulic cylinder systems 74 are not connected to the load sensing system 68. In addition, the plurality of hydraulic cylinder systems are isolated from (i.e., not coupled to) the supply line 52. The plurality of hydraulic cylinder systems 74 are disconnected from a dual section motor control valve block. The load pressure of the plurality of hydraulic cylinder systems 74 is significantly greater than the respective load pressures of the hydraulic motors 66. Not having the plurality of hydraulic cylinder systems 74 coupled to load sensing system 68 and the supply line 52 reduces the overall supply pressure demand from the pump 58 of the work vehicle 10, reduces throttling losses on all other motor functions, and reduces both the pump outlet power and the pump shaft power.

A boost pump or additional hydraulic motor 76 is coupled to the plurality of hydraulic cylinder systems 74. The additional hydraulic motor 76 is distinct from the other hydraulic motors 76 already located on the implement 12 and designated for functions of the implement 12. The boost pump or additional hydraulic motor 76 is configured to take flow from the supply line 52 or the return line 54 and boost it to the cylinder systems' required pressured level. One of the hydraulic motors 66 located on the implement 12 with a very low load is coupled to and utilized to power (e.g., hydraulically power) the boost pump or the additional hydraulic motor 76. For example, the boost pump or additional hydraulic motor 76 may be coupled to an alternator motor that powers (e.g., hydraulically powers), via a generator, the boost pump or the additional hydraulic motor 76.

The boost pump or the additional hydraulic motor 76 supplies the average flow (e.g., steady-state flow) of the hydraulic fluid to the hydraulic cylinder systems 74. The implement hydraulic system 50 includes an accumulator 78 coupled to both the hydraulic cylinder systems 74 and the boost pump or additional hydraulic motor 76. The accumulator 78 is configured to stabilize the pressure in the implement hydraulic system 50, particularly, during transient conditions it absolves the transient flow. For example, during planting operations, the hydraulic cylinder systems 74 will consume more flow, where the boost pump or the additional hydraulic motor 76 provides the average flow and the accumulator 78 will handle any additional large transient flow. When the hydraulic cylinder systems 74 needs are lower, the boost pump or the additional hydraulic motor 76 will charge the accumulator 78 until it is full and then additional flow goes through a relief valve.

In certain embodiments, to avoid wasting energy by discharging excess flow through a relief valve, the implement hydraulic system 50 may include an accumulator-sense unloading valve 80. The unloading valve 80 may be coupled between the boost pump 82 and both the accumulator 78 and the hydraulic cylinder systems 74. A check valve may be utilized in conjunction with the unloading valve, where the check valve separates the boost pump 82 from the hydraulic cylinder systems 74. When the boost pump 82 is charging the accumulator 78, both a relief valve and the unloading valve 80 are closed. Once the accumulator 78 is charged to its maximum capacity, the unloading valve 80 opens resulting in the relief valve being set to approximately 0. The boost pump 82 is then taken down to minimum pressure and all flow from the boost pump 82 is unloaded over the relief valve back to the supply line from which it receives flow (e.g., supply line 52 or return line 54). At this point, the check valve is closed and retains high pressure to operate the hydraulic cylinder systems 74 (via the accumulator 78) at the required pressure, while the low pressure flow from the boost pump 82 is unloaded over the relief valve. Once the accumulator 78 reaches a lower state of charge (which is set by the unloading valve 80), the relief valve and the unloading valve 80 are closed and the flow from the boost pump 82 to the hydraulic cylinder systems 74 and the accumulator 78 resumes to enable recharging of the accumulator 78.

The accumulator pressure is set above supply pressure for the hydraulic cylinder systems 74 (i.e., cylinder load pressure), while the supply pressure in the supply line 52 is lower than the cylinder load pressure. With the plurality of hydraulic cylinder systems 74 isolated from the supply line 52, the pump 58 only needs to provide the hydraulic fluid to the implement hydraulic system 50 at the pressure of the highest load (as determined via the load sensing system 68) from among the plurality of hydraulic motors 66.

Figure 3:
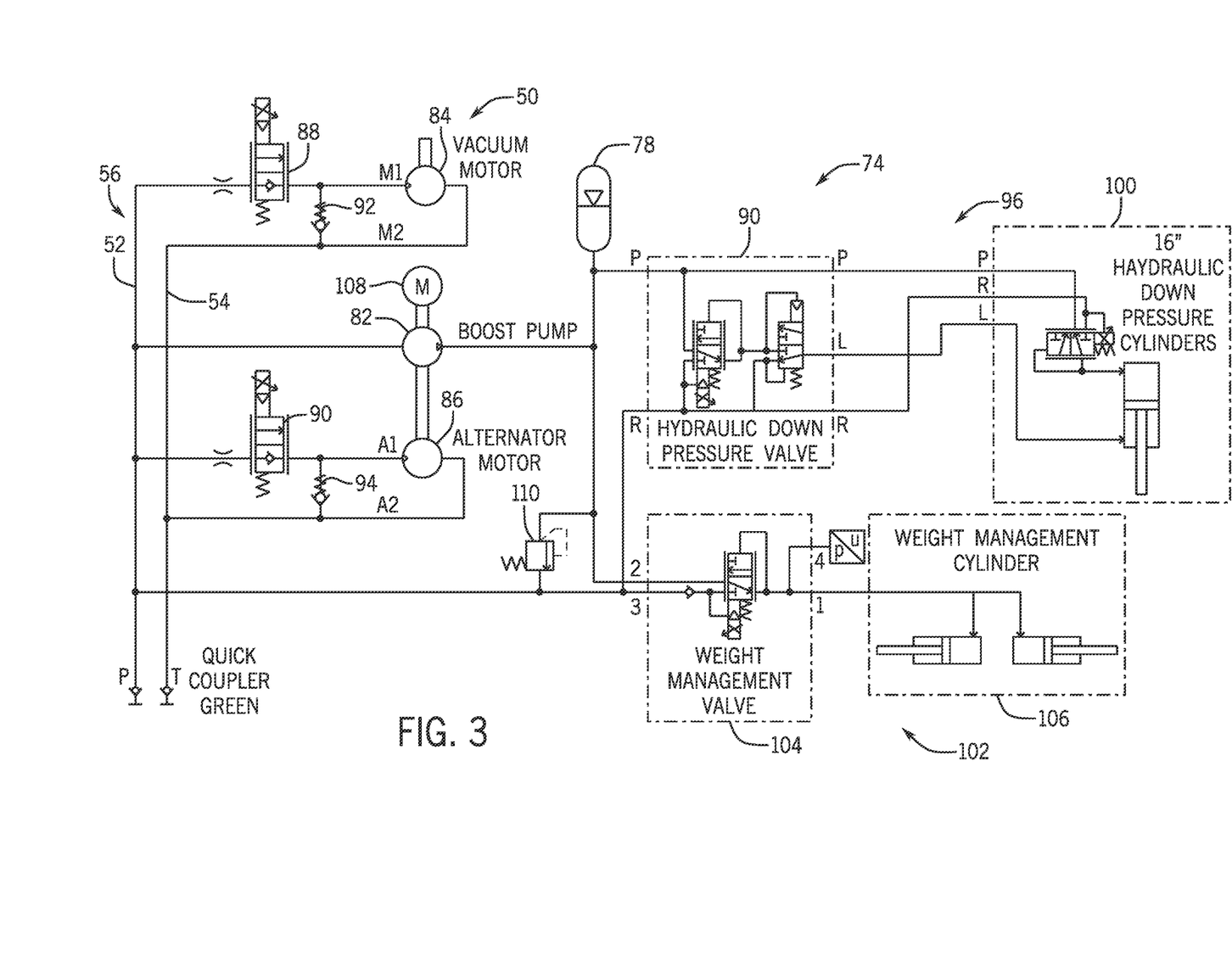
FIG. 3 is a schematic view of an implement hydraulic system (e.g., having a boost pump coupled to a supply line), in accordance with aspects of the present disclosure.
Figure 6:
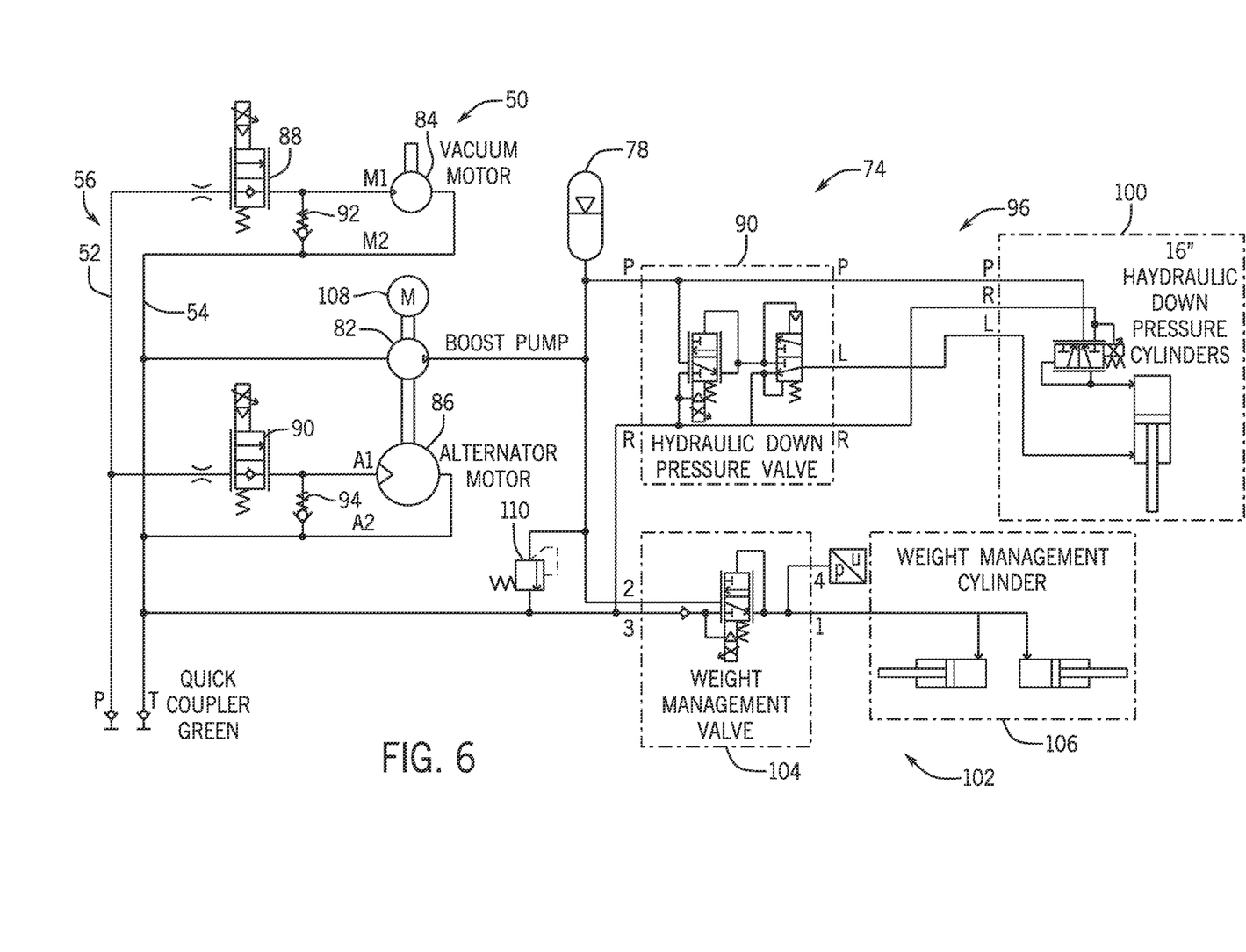
FIG. 6 is a schematic view of an implement hydraulic system (e.g., having a boost pump coupled to a return line), in accordance with aspects of the present disclosure.
Figure 7:
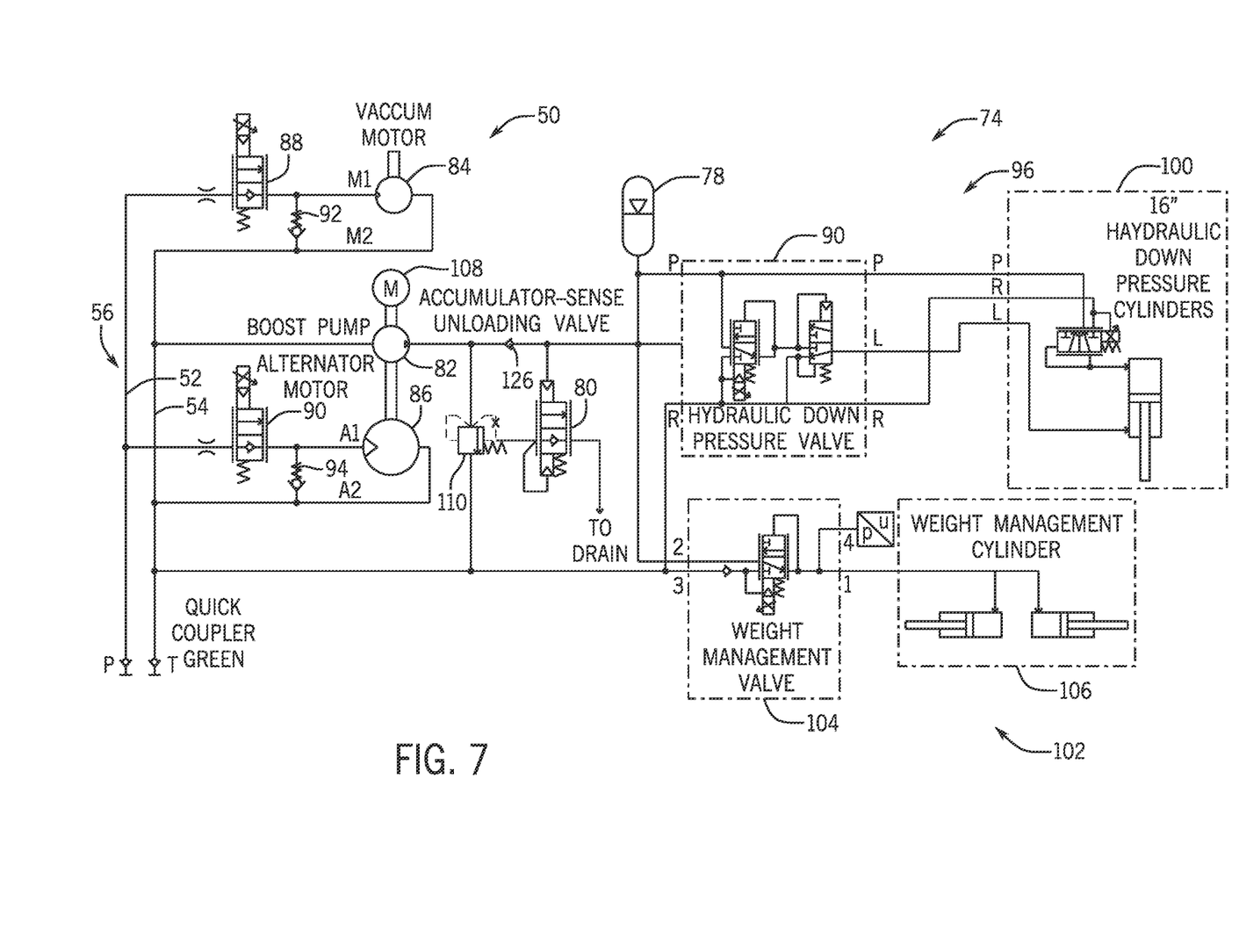
FIG. 7 is a schematic view of an implement hydraulic system (e.g., having an unloading valve and a boost pump coupled to a return line), in accordance with aspects of the present disclosure.

FIGS. 3, 6, and 7 are different schematic views of the implement hydraulic system 50 having a boost pump 82. In certain embodiments, as discussed above, an additional hydraulic motor may be utilized instead of the boost pump 82 in the implement hydraulic systems 50 in FIGS. 3, 6, and 7. FIG. 3 is a schematic view of the implement hydraulic system 50 having the boost pump 82 (e.g., through shaft boost pump) coupled to supply line 52. As depicted in FIG. 3, the implement hydraulic system 50 includes the main hydraulic circuit 56 having the supply line 52 (e.g., high pressure supply line) and the return line 54 (e.g., low pressure supply line). The hydraulic fluid is provided to the main hydraulic circuit 56 via a pump (e.g., pump 58 in FIG. 2) on a work vehicle (e.g., work vehicle 10 in FIG. 2). A vacuum motor 84 and alternator motor 86 are both coupled to supply line 52 from which they receive hydraulic fluid. The vacuum motor 84 and the alternator motor 86 are associated with a control valve 88 (e.g., control valve block) and a control valve 90 (e.g., control valve block), respectively. The control valves 88, 90 are associated with anti-cavitation check valves 92, 94, respectively. If control valves 88, 90 are closed suddenly, the motor will continue to spin under inertia. The anti-cavitation check valves 92, 94 allow flow to circulate from high pressure to low pressure during the "spin down" time, preventing a cavitation condition where motor supply pressure drops too low.

The hydraulic cylinder systems 74 are isolated from (i.e., not coupled to) the supply line 52. Also, the hydraulic cylinder systems 74 are disconnected from the dual section motor control valve block (i.e., the control valves 88, 90 of the vacuum motor 84 and the alternator motor 86). The hydraulic cylinder systems 74 include a hydraulic down pressure system 96 including a hydraulic pressure valve 98 coupled to a plurality of hydraulic down pressure cylinders 100. The hydraulic cylinder systems 74 also includes a weight management (e.g., weight distribution) cylinder system 102 including a weight management valve 104 and a weight management cylinder 106. The hydraulic cylinder systems 72 are not connected to load sensing ports.

The implement hydraulic system 50 also includes the boost pump 82 coupled to the supply line 52. The sizing of the boost pump 82 utilized is determined via the following equation:

$$V_{Boost} \geq \frac{q_{cyl}}{n_{Alt} \eta_{V_{Boost}}}, \quad (1)$$

where $V_{Boost}$ is the volume of the boost pump 82, $q_{Cyl}$ is the average flow rate for the cylinder systems 74, $n_{Alt}$ is the alternator speed, and $n_{V_{Boost}}$ is the volumetric efficiency of the boost pump 82.

The boost pump 82 (at the boost pump inlet) is configured to take flow (e.g., high pressure flow) from the supply line 52 and boost it to the cylinder systems' required pressured level. The alternator motor 86 has a very low load (i.e., low required pressure level) and is coupled to and utilized to power (e.g., hydraulically power) the boost pump 82. The alternator motor 86 powers the boost pump 82 and a generator 108.

The boost pump or the additional hydraulic motor 76 supplies the average flow (e.g., steady-state flow) of the hydraulic fluid to the hydraulic cylinder systems 74. The implement hydraulic system 50 includes the accumulator 78 coupled to both the hydraulic cylinder systems 74 and the boost pump 82. The accumulator 78 is configured to stabilize the pressure in the implement hydraulic system 50, particularly, during transient conditions it is configured to absolve the transient flow. For example, during planting operations, the hydraulic cylinder systems 74 will consume more flow, where the boost pump 82 provides the average flow and the accumulator 78 will handle any additional large transient flow. When the hydraulic cylinder systems 74 needs are lower, the boost pump 82 will charge the accumulator 78 until it is full and then additional flow goes through a relief valve 110 and to the supply line 52.

The size of the accumulator 78 depends on how much of the transient flow needs to be handled by it. The accumulator pressure is set above supply pressure for the hydraulic cylinder systems 74 (i.e., cylinder load pressure), while the supply pressure in the supply line 52 is lower than the cylinder load pressure. With the plurality of hydraulic cylinder systems 74 isolated from the supply line 52, the pump on the work vehicle only needs to provide the hydraulic fluid to the implement hydraulic system 50 at the pressure of the highest load (as determined via a load sensing system) from among the plurality of hydraulic motors on the implement (e.g., planter).

Figure 4:
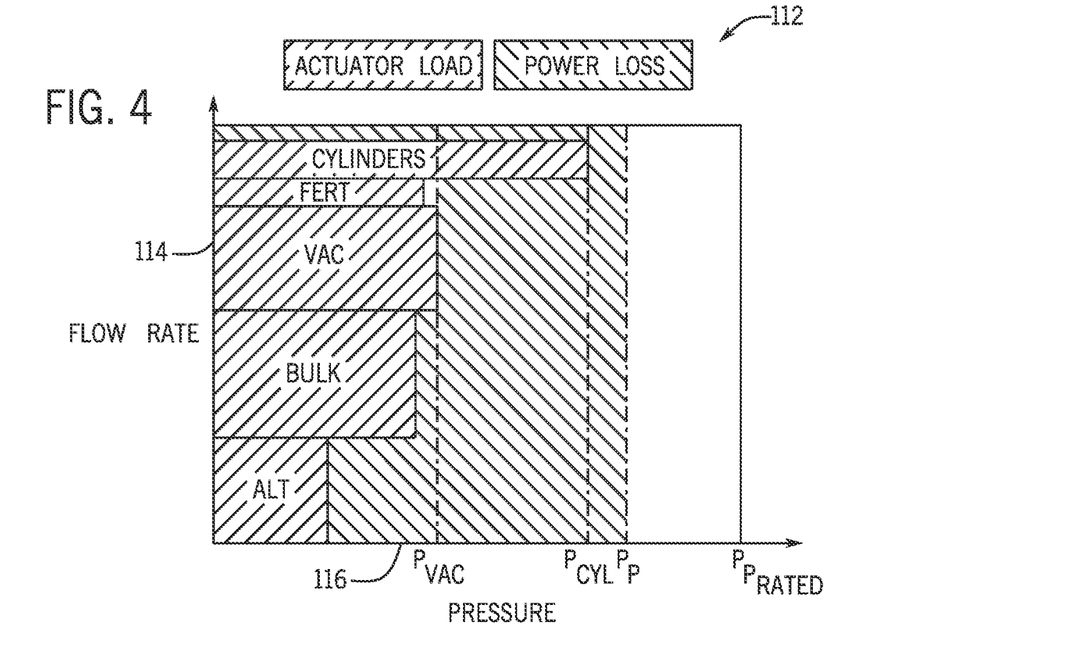
FIG. 4 is a graph illustrating actuator load and power loss for various components of a planter system (e.g., with hydraulic cylinder systems coupled to supply line and load sensing system)

FIG. 4 is a graph 112 illustrating actuator load and power loss for various components of a planter system (e.g., with hydraulic cylinder systems coupled to supply line and load sensing system). The planter system has a load sensing architecture or system. The graph 112 is based on steady-state measurements of a planter where the hydraulic cylinder systems are coupled to the supply line of the main hydraulic circuit (i.e., the hydraulic cylinder systems are not isolated), the hydraulic cylinder systems are coupled have load sensing port coupled to the load sensing system of the planter, and the planter lacks both a boost pump and accumulator. The graph 112 includes a y-axis 114 representing flow rate and an x-axis 116 representing the load pressure (e.g., required pressure) for various components of the planter (e.g., hydraulic cylinder systems (Cylinders), fertilizer drive motor (Fert), vacuum fan motor (Vac), bulk fill fan motor (Bulk), and alternator motor (Alt)).

As depicted in the graph 112, during stead-state operation, the cylinder systems' load pressure indicated by $p_{Cyl}$ is much greater than all other motor functions. Due to the load sensing architecture of the planter, the supply pressure (i.e., pump outlet pressure, $p_p$) from the pump (of the work vehicle) has to follow the highest load pressure (i.e., the cylinder systems' load pressure) plus the pump margin (difference between $p_p$ and highest load pressure among components). This results in large throttling losses (i.e., power losses) for every other hydraulic system on the planter (which are provided the hydraulic fluid as a much higher level than needed) as indicated in the graph 112 since these other hydraulic systems waste a significant amount of energy metering the high pressure down to a suitable level.

Figure 5:
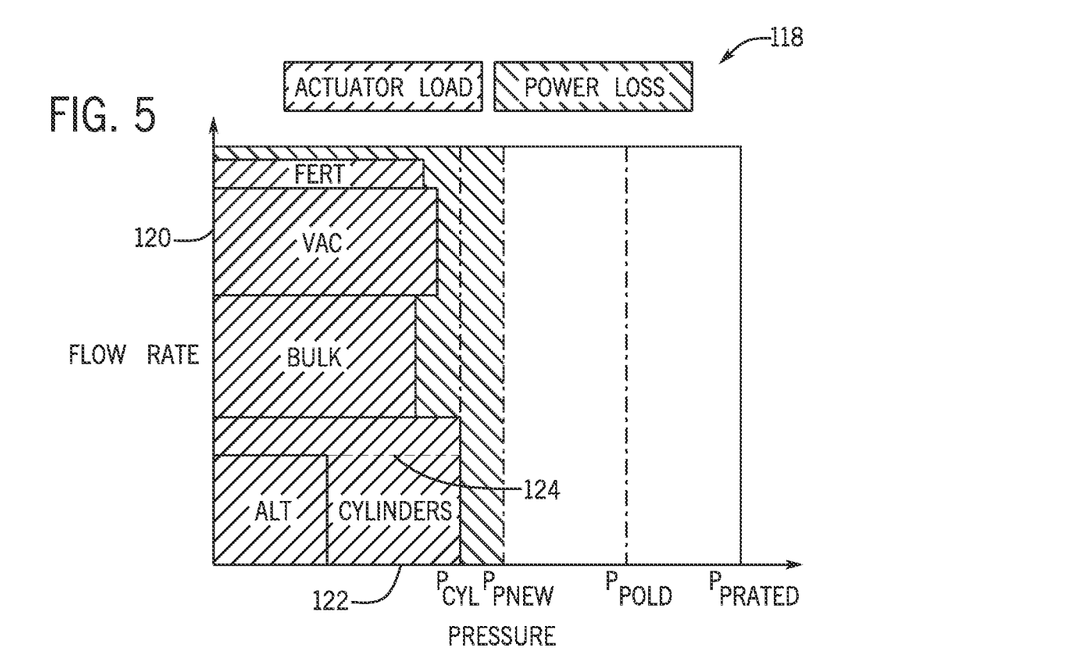
FIG. 5 is a graph illustrating actuator load and power loss for various components of a planter system (e.g., with hydraulic cylinder systems isolated from the supply line and not coupled to the load sensing system), in accordance with aspects of the present disclosure.

Isolating the hydraulic cylinder systems from the supply line and not coupling the hydraulic cylinder systems to the load sensing system avoids the wasting of energy seen in the graph 112. FIG. 5 is a graph 118 illustrating actuator load and power loss for various components of a planter system (e.g., with hydraulic cylinder systems isolated from the supply line and not coupled to the load sensing system). The graph 118 is based on steady-state measurements of a planter having an implement hydraulic system as described in FIG. 3 with the hydraulic cylinder systems isolated from the supply line, the hydraulic cylinder systems are not coupled to the load sensing system, and a boost pump (driven by the alternator motor) and accumulator are coupled to the hydraulic cylinder systems. The graph 118 includes a y-axis 120 representing flow rate and an x-axis 122 representing the load pressure (e.g., required pressure) for various components of the planter (e.g., hydraulic cylinder systems (Cylinders), fertilizer drive motor (Fert), vacuum fan motor (Vac), bulk fill fan motor (Bulk), and alternator motor (Alt)). As depicted in the graph 118, since the pump of the work vehicle only needs to provide the pressure around the highest load of the motors, which is much lower than the cylinder load pressure, the throttling losses are reduced (when compared to graph 112).

One part the hydraulic cylinder systems' pressure level for cylinder flow comes from the pump of the work vehicle (indicated by the area above the dotted line 124) and the other part of the pressure level comes from the alternator motor (indicated by the area below the dotted line 124) expending additional energy, which is then utilized to take the pressurized fluid from high pressure to an even higher pressure. Comparing the graph 118 to the graph 112, the total area of the hydraulic cylinder systems is different. The hydraulic cylinder systems in the hydraulic cylinder systems of FIG. 3 need more additional energy spent as indicated by the graph 118. This is due to the pressure of the accumulator needing to be kept above the supply pressure for the hydraulic cylinder systems. Comparing the graph 118 to the graph 112, all other systems' load pressures with the exception of the alternator which has the hydraulic cylinder systems added to it are the same.

To determine the final power consumption in the hydraulic system of the planter in FIG. 3, the new alternator motor load pressure needs to be calculated. With the hydraulic cylinder systems added to the alternator system, it can be assumed the alternator is the highest load on the planter (which is shown in the graph 118). The new pump outlet pressure ($p_p$) is determined by the following equation:

$$p_p = p_{Alt} + p_{mar}, \quad (2)$$

where $p_{Alt}$ represents load pressure for the alternator motor and $p_{mar}$ represents pump margin pressure. The new planter inlet pressure (which is inlet pressure for the boost pump) ($p_{RemoteP}$ or $p_R$) is determined by the following equation:

$$p_{RemoteP} = p_p - p_{drop}, \quad (3)$$

where $p_{drop}$ represents the pressure drop form the pump outlet to the planter inlet (e.g., due to EHR valve). The total pressure the boost pump ($p_{Boost}$) needs to boost is determined by the following equation:

$$p_{Boost} = p_{sat} - p_{RemoteP}, \quad (4)$$

where $p_{sat}$ represents the saturation pressure. The total torque ($T_{Boost}$) the boost pump needs from the alternator motor is determined by the following equation:

$$T_{Boost} = \frac{V_{Boost} p_{Boost}}{2\pi \eta_{HM}} \quad (5)$$

where $\eta_{HM}$ represents hydromechanical efficiency. Due to the added alternator load pressure due to the cylinder system boost pump ($p_{Alt_{Boost}}$) is determined by the following equation:

$$p_{Alt_{Boost}} = \frac{2\pi T_{Boost}}{V_{Alt} \eta_{HM}}, \quad (6)$$

where $V_{alt}$ is the size of the alternator motor. Finally, the new alternator load pressure ($p_{Alt}$) is determined by the following equation:

$$p_{Alt} = p_{Alt_{current}} + p_{Alt_{Boost}}, \quad (7)$$

where $p_{Alt_{current}}$ is the alternator load pressure in the absence of driving hydraulic cylinder systems via the boost pump. The new alternator load pressure is the highest load pressure on the planter which is utilized to determine the tractor pump outlet pressure in equation (2). The hydraulic system of the planter in FIG. 3 reduces both the pump outlet power and the pump shaft power compared to a hydraulic system of a planter utilized for the graph 112 in FIG. 4 and a hydraulic system of a planter lacking a load sensing architecture.

The implement hydraulic system in FIG. 3 enables the boost pump inlet to be at high pressure, which greatly reduces the amount of pressure drop it needs to boost and lower the load on the alternator. However, as noted in the graph 118 in FIG. 5, the new alternator load pressure is still the highest load on the planter. It may be difficult to find a pump that can receive high pressure flow at its inlet. Thus, in certain embodiments, the boost pump may be coupled at its inlet to the return line. FIG. 6 is a schematic view of the implement hydraulic system 50 (e.g., having the boost pump 82 coupled to the return line 54). As depicted in FIG. 6, the boost pump 82 (at its inlet) is coupled to the return line 54 (where the hydraulic fluid is at a lower pressure than the supply line 52) instead of the supply line 52. However, having the boost pump 82 boost the pressure of the hydraulic fluid from the return pressure to the saturation pressure may overload the alternator motor 86 and the drive the alternator motor load pressure much higher resulting in a loss of power saving. Thus, the alternator motor 86 is resized to a bigger motor (as indicated by a larger circle in FIG. 6 compared to FIG. 3) in order to work with the boost pump 82 coupled to the lower pressure hydraulic fluid at its inlet port. In this case, the boost pump 82 is the same size as the cylinder systems' flow rate requirement and the alternator speed is the same as utilized in FIG. 3. When resizing the alternator motor, it is desired that the larger alternator motor load pressure does not exceed the current highest motor load pressure (which is the vacuum fan system). As a result, the maximum usable load pressure across the larger alternator motor ($p_{Alt_{max}}$) is determined by the following equation:

$$p_{Alt_{max}} = p_{Vac} - p_R, \quad (8)$$

where $p_{Vac}$ represents the load pressure for the vacuum motor. As the alternator motor size is changed, the alternator load needs to be calculated in the form of torque ($T_{Alt}$) to be added with the additional load torque from the boost pump 82 as shown in the following equations:

$$T_{Alt} = \frac{(p_{Alt} - p_R) V_{Alt}}{2\pi \eta_{HM}} \quad (9)$$

and $$T_{total} = T_{Alt} + T_{Boost}. \quad (10)$$

The new alternator size may be calculated as shown in the following equation:

$$V_{Alt_{new}} \geq \frac{T_{total} 2\pi}{p_{Alt_{max}} \eta_{HM}}. \quad (11)$$

The hydraulic system 50 of the planter in FIG. 6 (similar hydraulic system 50 in FIG. 3) reduces both the pump outlet power and the pump shaft power compared to a hydraulic system of a planter utilized for the graph 112 in FIG. 4 and a hydraulic system of a planter lacking a load sensing architecture.

Figure 8:
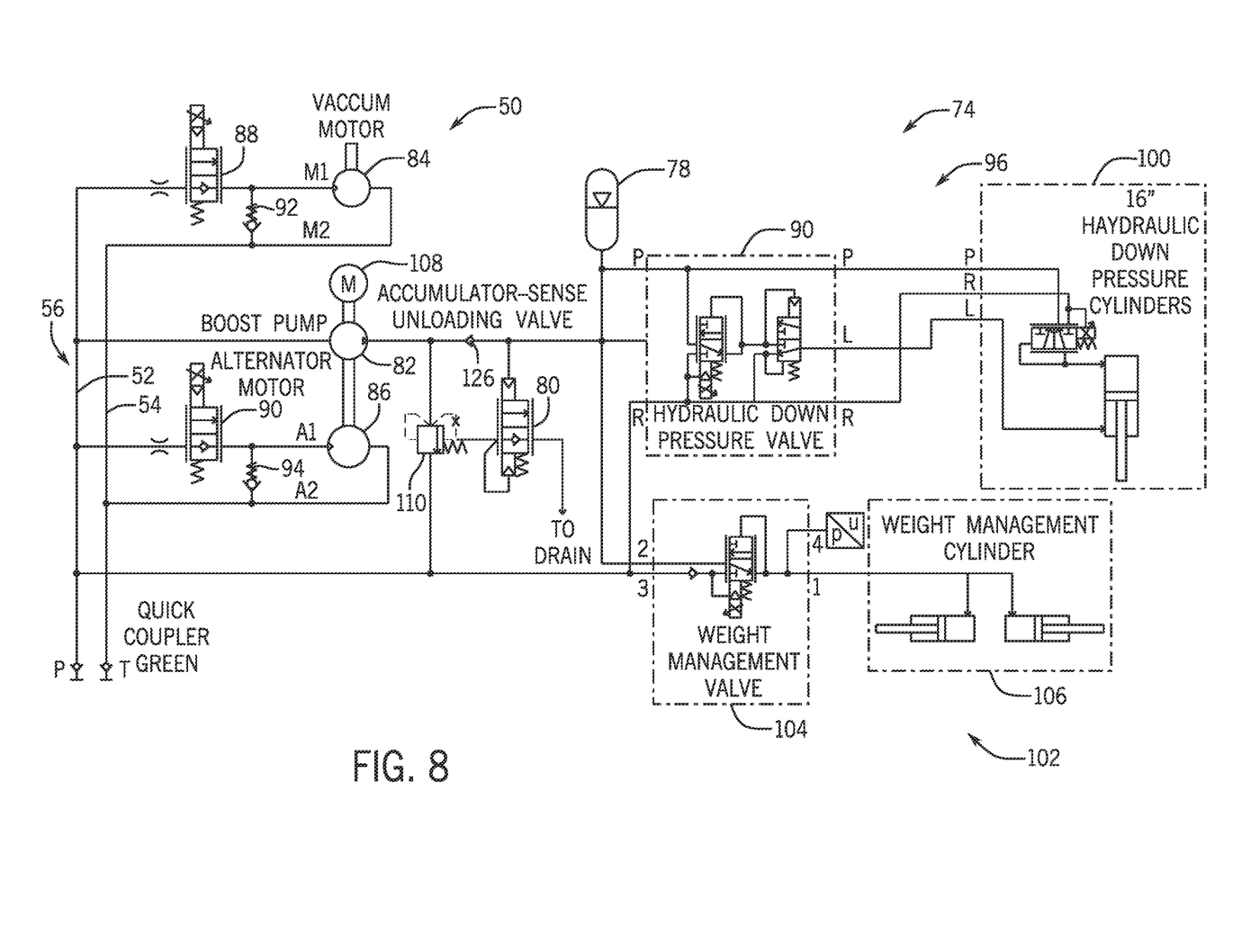
FIG. 8 is a schematic view of an implement hydraulic system (e.g., having an unloading valve and a boost pump coupled to a supply line), in accordance with aspects of the present disclosure.

In certain embodiments, to avoid wasting energy by discharging excess flow through the relief valve 110 (e.g., when the accumulator 78 is fully charged), the implement hydraulic system 50 may include the accumulator-sense unloading valve 80 as shown in FIG. 7. FIG. 7 is a schematic view of the implement hydraulic system 50 (e.g., having the unloading valve 80 and the boost pump 82 coupled to the return line 54). In certain embodiments, the hydraulic system 50 in FIG. 3 having the boost pump 82 coupled to the supply line 52 may also include the unloading valve 80 (e.g., having the unloading valve 80 and the boost pump 82 coupled to the supply line 52 as depicted in FIG. 8) in a similar manner. As depicted in FIG. 7, the unloading valve 80 is coupled between the boost pump 82 and both the accumulator 78 and the hydraulic cylinder systems 74. A check valve 126 separates the boost pump 82 from the hydraulic cylinder systems 74. When the boost pump 82 is charging the accumulator 78, both the relief valve 110 and the unloading valve 80 are closed. Once the accumulator 78 is charged to its maximum capacity, the unloading valve 80 opens resulting in the relief valve 110 being set to approximately 0. The boost pump 82 is then taken down to minimum pressure and all flow from the boost pump 82 is unloaded over the relief valve 110 back to the return line 54 at minimum pressure where it returns to the source (e.g., tank) on the work vehicle. In certain embodiments, wherein the boost pump 82 is coupled to the supply line 52, the boost pump is unloaded over the relief valve 110 back to the supply line 52. At this point, the check valve 126 is closed and retains high pressure to operate the hydraulic cylinder systems 74 (via the accumulator 78) at the required pressure, while the low pressure flow from the boost pump 82 is unloaded over the relief valve 110. Once the accumulator 78 reaches a lower state of charge (which is set by the unloading valve 80), the relief valve 110 and the unloading valve 80 are closed and the flow from the boost pump 82 to the hydraulic cylinder systems 74 and the accumulator 78 resumes to enable recharging of the accumulator 78.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hydraulic drive system for an agricultural implement, comprising:
   a high pressure supply line configured to provide hydraulic fluid under pressure;
   a low pressure return line configured to return the hydraulic fluid;
   a plurality of hydraulic motors and coupled to the high pressure supply line; and
   a plurality of cylinder systems not directly fluidly coupled to the high pressure supply line to minimize a supply pressure of the hydraulic fluid provided from a pump coupled to the high pressure supply line and to minimize throttling losses in the hydraulic drive system during operation of the hydraulic drive system, wherein plurality of cylinder systems comprises a weight management cylinder system and a hydraulic down pressure cylinder system.

2. The hydraulic drive system of claim 1, wherein the supply pressure is lower than a cylinder load pressure of the plurality of cylinder systems.

3. The hydraulic drive system of claim 1, comprising a boost pump having an inlet coupled to the high pressure supply line or to the low pressure return line, wherein the boost pump is coupled to and configured to hydraulically power the plurality of cylinder systems.

4. The hydraulic drive system of claim 3, wherein the boost pump has the inlet coupled to the high pressure supply line.

5. The hydraulic drive system of claim 3, wherein the boost pump has the inlet coupled to the low pressure return line.

6. The hydraulic drive system of claim 3, wherein a hydraulic motor from among the plurality of hydraulic motors is coupled to and configured to power the boost pump.

7. The hydraulic drive system of claim 6, wherein the hydraulic motor comprises an alternator motor configured to power the boost pump via a generator.

8. The hydraulic drive system of claim 3, comprising an accumulator coupled to the plurality of cylinder systems and configured to stabilize pressure in the hydraulic drive system, wherein the boost pump is configured to provide an average flow of the hydraulic fluid to the plurality of cylinder systems, and the accumulator is configured to provide an additional flow of the hydraulic fluid to the plurality of cylinder systems when needed.

9. The hydraulic drive system of claim 1, wherein each hydraulic motor of the plurality of hydraulic motors is coupled to a respective load sensing port for providing a respective load sensing signal, wherein the hydraulic drive system comprises a load sensing line coupled to the respective load sensing ports of the plurality of hydraulic motors, wherein the load sensing line is configured to provide a load sensing signal to a work vehicle coupled to the agricultural implement that provides the hydraulic fluid to the high pressure supply line, and wherein the load sensing signal is from a highest load pressure from among the respective load sensing signals.

10. The hydraulic drive system of claim 1, wherein the agricultural implement comprises a planter.

11. A hydraulic drive system for an agricultural planter, comprising:
   a high pressure supply line configured to provide hydraulic fluid under pressure;
   a low pressure return line configured to return the hydraulic fluid;
   a plurality of hydraulic motors coupled to the high pressure supply line;
   a plurality of cylinder systems not directly fluidly coupled to the high pressure supply line; and
   a load sensing system coupled to the plurality of hydraulic motors, wherein the load sensing system is configured to provide a load sensing signal to a work vehicle coupled to the agricultural implement that provides the hydraulic fluid to the high pressure supply line, and wherein the load sensing signal is from a highest load pressure from among the plurality of hydraulic motors; and wherein the plurality of hydraulic motors comprises an alternator motor, and the alternator motor is configured to power the boost pump via a generator.

12. The hydraulic drive system of claim 11, comprising a boost pump having an inlet coupled to the high pressure supply line or to the low pressure return line, wherein the boost pump is coupled to and configured to hydraulically power the plurality of cylinder systems.

13. The hydraulic drive system of claim 11, comprising an accumulator coupled to both the plurality of cylinder systems and the boost pump, the accumulator being configured to stabilize pressure in the hydraulic drive system, wherein the boost pump is configured to provide an average flow of the hydraulic fluid to the plurality of cylinder systems, and the accumulator is configured to provide an additional flow of the hydraulic fluid to the plurality of cylinder systems when needed.

14. The hydraulic drive system of claim 1, wherein the plurality of cylinder systems not being directly fluidly coupled to the high pressure supply line minimizes a supply pressure of the hydraulic fluid provided from a pump coupled to the high pressure supply line and minimizes throttling losses in the hydraulic drive system during operation of the hydraulic drive system.

15. The hydraulic drive system of claim 14, wherein the supply pressure is lower than a cylinder load pressure of the plurality of cylinder systems.

16. An agricultural planter, comprising:
a hydraulic drive system, comprising:
a high pressure supply line configured to provide hydraulic fluid under pressure;
a low pressure return line configured to return the hydraulic fluid;
a plurality of hydraulic motors and coupled to the high pressure supply line;
a plurality of cylinder systems not directly fluidly coupled to the high pressure supply;
a boost pump having an inlet coupled to the high pressure supply line or to the low pressure return line, wherein the boost pump is coupled to and configured to hydraulically power the plurality of cylinder systems; and
an accumulator coupled to both the plurality of cylinder systems and the boost pump, the accumulator being configured to stabilize pressure in the hydraulic drive system;
wherein a hydraulic motor from among the plurality of hydraulic motors is coupled to and configured to hydraulically power the boost pump.

* * * * *